United States Patent [19]

Lewinski

[11] Patent Number: 4,568,056

[45] Date of Patent: Feb. 4, 1986

[54] TILT MECHANISM FOR A STAND-ALONE KEYBOARD

[75] Inventor: Kenneth F. Lewinski, Hoffman Estates, Ill.

[73] Assignee: AT&T Teletype Corporation, Skokie, Ill.

[21] Appl. No.: 627,171

[22] Filed: Jul. 2, 1984

[51] Int. Cl.$^4$ ............... F16M 13/00; A47B 91/02
[52] U.S. Cl. ................... 248/677; 248/456; 248/359
[58] Field of Search ............ 248/456, 359 E, 676, 248/677, 455, 359 C, 349

[56] References Cited

U.S. PATENT DOCUMENTS

| | | | |
|---|---|---|---|
| 1,363,664 | 12/1920 | Livingston | 248/359 E |
| 1,598,931 | 9/1926 | Patche | 248/359 E |
| 1,681,732 | 8/1928 | Gray | 248/359 E |
| 2,648,139 | 8/1958 | Wilkerson | 248/349 |
| 3,361,402 | 1/1968 | Cech | 248/188.8 |
| 4,375,804 | 3/1983 | Ciarlei | 248/677 |

FOREIGN PATENT DOCUMENTS 19597 of 1906 United Kingdom ............ 248/456

*Primary Examiner*—Reinaldo P. Machado
*Assistant Examiner*—Alvin Chin-Shue
*Attorney, Agent, or Firm*—A. A. Tirva

[57] ABSTRACT

A tilt mechanism for a stand-alone keyboard includes two molded springs located within the keyboard enclosure. One end of each spring is anchored within the enclosure while the other end shaped in the form of a foot is free to move through openings located in the bottom portion of the keyboard. Notches located on the outer periphery of each foot are adapted to engage an edge of the opening locking the foot in place after a required length of the foot extends from the enclosure.

5 Claims, 3 Drawing Figures

TILT MECHANISM FOR A STAND-ALONE KEYBOARD

DESCRIPTION

1. Technical Field

This invention relates to desk top keyboards associated with CRT (cathode ray tube) display terminals and more particularly to tilt mechanisms utilized in such keyboards.

2. Background Art

Desk top CRT display terminals, both with attached or stand-alone, keyboards have been available commercially for a number of years. Because of the many attractive features offered by these terminals their use has been increasing steadily year by year. These terminals have been especially well accepted in the office environment; and such terminals, in combination with hard copy printing devices, are rapidly replacing conventional typewriters.

The stand-alone keyboard, in combination with a CRT display, allows implementation of many different configurations of an office work station. For example, the keyboard may be placed on top of a desk or on another flat surface which may be either higher or lower than the desk surface. While this versatility is an advantage, the key field of the keyboard is usually sloped fifteen degrees from the horizontal which has been determined to be the most convenient and comfortable angle for an operator to use when a keyboard is located on a standard height typewriter stand. To cope with the many height variations at which the keyboard may be located as well as to compensate for operator's height variations, a need exists for a low-cost mechanism for tilting the keyboard and varying the inclination angle of the key field so as to relieve operator fatigue and general discomfort.

DISCLOSURE OF THE INVENTION

In accordance with the present invention, I provide a keyboard tilt mechanism which includes two molded springs located within the keyboard enclosure, each spring having one end shaped in the form of a foot which is free to move through an opening in the enclosure located opposite each foot and having the other end fixed within the enclosure. Each foot has a plurality of notches located on its outer periphery, the notches being adapted to engage an edge of the opening locking the foot in place.

THE DRAWING

DETAILED DESCRIPTION

Figure 1:
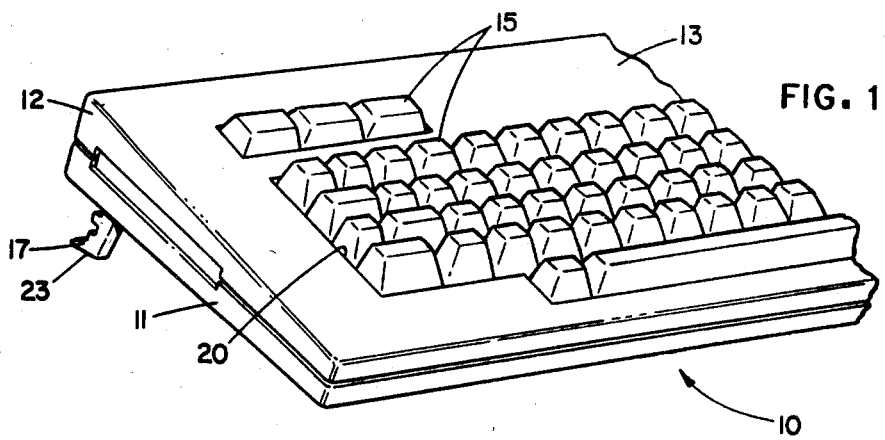
FIG. 1 is a partial perspective view of a stand-alone keyboard.
Figure 2:
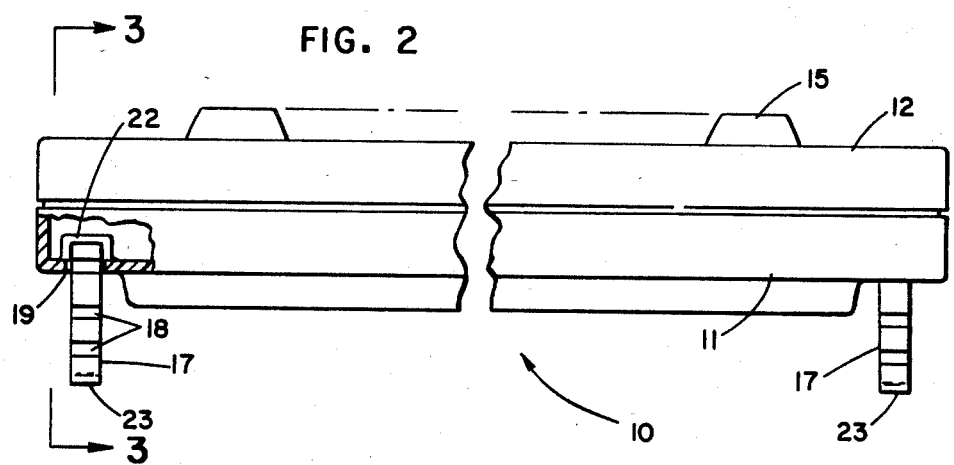
FIG. 2 is a rear view of the keyboard shown in FIG. 1.
Figure 3:
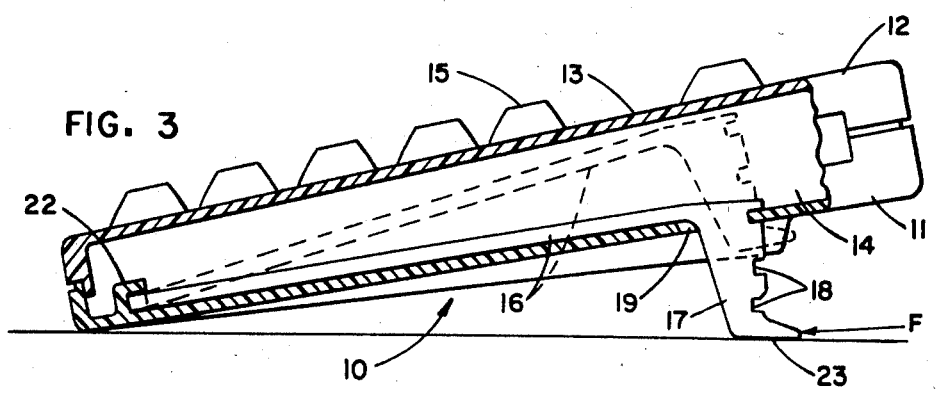
FIG. 3 is a sectional view of the keyboard taken along line 3—3 of FIG. 2.

Referring now to the drawing in detail and specifically to FIG. 3, there is shown a keyboard 10 having a bottom portion 11 and a top portion 12. Both the top portion 12 and the bottom portion 11 may be manufactured by the injection molding process from a thermal setting type of material. When the two portions 11 and 12 are assembled, as shown in FIG. 3, they define a substantially rectangular enclosure 14. The top portion 12 has a key field surface 13 inclined 15 degrees from the horizontal and containing a plurality of keytops 15 which extend through openings 20 in the top portion 12. Keyswitch mechanisms associated with the keytops 15 are located within the enclosure 14 and since they are well known in the art, they are neither shown in the drawing nor discussed in the specification.

At each end of the keyboard 10, there is shown a spring 16 which also may be manufactured by the injection molding process. Each spring 16 has a free end terminating in the shape of a foot 17. The other end of the spring 16 is attached to the bottom portion 11 using a closed "U" shape retainer 22. Retainer 22 may be molded as part of the bottom portion 11 by projecting the U-shaped portion of the retainer 22 from the bottom portion 11 whereby the retainer 22 defines an opening of a size and shape to accommodate one end of the resilient spring 16.

Each foot 17 is located substantially opposite an opening 19 in the bottom portion 11. The opening 19 is sufficiently large to allow the major portion of the foot 17 to extend outside of the enclosure 14. Each spring 16 is made of a shape as shown in FIG. 3 and is located within the enclosure 14. Normally, each foot 17 when not in use, i.e. not required to increase the tilt angle of the key field 13, resides within the enclosure 13 as shown by dotted lines. Each foot 17 has on its outer periphery a plurality of notches 18, each of a size and shape adapted to accommodate a portion of the bottom portion 11 surrounding each opening 19. When the spring 16 is not in use, only a tip portion 23 of foot 17 extends through opening 19. The foot 17 is locked in place by the engagement of the lower most notch 18 with the bottom portion 11. To increase the angle of inclination with the horizontal, a portion of the foot 17 is withdrawn from the keyboard enclosure 14 by first applying a force F to the tip portion 23 in the direction shown in FIG. 3. This action disengages the lower most notch 18 from the bottom portion 11 allowing the foot 17 to be pulled from the enclosure 14. When a sufficient length of the foot 17 extends through the opening 19 to provide the desired angle of inclination, force F is reduced to allow one of the notches 18, closest to the bottom portion 11, to engage it thereby locking the foot 17 in place.

What is claimed is:

1. A tilt mechanism for a stand-alone keyboard having a top and a bottom portion forming a substantially rectangular enclosure for housing a plurality of keyswitches, the mechanism comprising:

a resilient member located within the enclosure and positioned at each side of the enclosure;

each resilient member having a free end terminating in the shape of a foot and having the outer end anchored within the enclosure;

means for anchoring one end of each resilient member;

the bottom portion having an aperture located substantially opposite the foot of each member, the aperture having size and shape allowing for a portion of the foot to extend through it; and means for releasably locking said foot in place.

2. A tilt mechanism in accordance with claim 1 wherein the top and bottom portions and each resilient member are molded from a thermal setting type of material.

3. A tilt mechanism in accordance with claim 2 wherein the means for anchoring each resilient member includes a closed end U-shaped retainer projecting from the bottom portion into the enclosure.

4. A tilt mechanism in accordance with claim 1 wherein the means for releasably locking the foot in place includes a plurality of notches located on the outer periphery of the foot, each notch being adapted to mate with the bottom portion of the keyboard enclosure bordering each aperture.

5. A tilt mechanism for a stand-alone keyboard having a top and a bottom portion forming a substantially rectangular enclosure for housing a plurality of keyswitches, the mechanism comprising:
   a resilient member located within the enclosure and positioned at each side of the enclosure;
   each resilient member having a free end terminating in the shape of a foot;
   means for anchoring the other end of each resilient member within the enclosure, the means including a U-shaped closed end retainer projecting from the bottom portion having a shape and size to accommodate the other end of the resilient member;
   each foot of the resilient member having a plurality of notches located on its outer periphery; and
   the bottom portion having an aperture located substantially opposite the foot of each member, the aperture having a size and shape allowing for a portion of the foot to extend through the aperture, the aperture positioned so that an edge of the aperture nearest the outer periphery of the foot engages one of the notches located on the outer periphery of the foot, locking the foot in place.

* * * * *

UNITED STATES PATENT OFFICE
CERTIFICATE OF CORRECTION

PATENT NO. : 4,568,056
DATED : February 4, 1986
INVENTOR(S) : KENNETH F. LEWINSKI It is certified that error appears in the above-identified patent and that said Letters Patent are hereby corrected as shown below:

Column 2, line 54, remove [outer] and insert --other--;
        line 62, remove [in place] and insert --to said bottom portion--.

Signed and Sealed this

Second Day of September 1986

[SEAL]

Attest:

DONALD J. QUIGG

*Attesting Officer*     *Commissioner of Patents and Trademarks*